United States Patent Office 3,393,180
Patented July 16, 1968

3,393,180
PROCESS FOR PREPARING POLYMERS CONTAINING CO—NH—NH—CO— GROUPS
Wilhelm Thoma, Cologne-Flittard, and Heinrich Rinke, Leverkusen, Germany, assignors to Farbenfabriken Bayer Aktiengesellschaft, Leverkusen, Germany, a German corporation
No Drawing. Filed June 6, 1963, Ser. No. 285,905
Claims priority, application Germany, June 15, 1962, F 37,084
5 Claims. (Cl. 260—78)

This invention relates to high molecular weight polymers and to a method of preparation. More particularly, it relates to a method of preparing polymers containing a plurality of —CO—NH—NH—CO— groups.

It has been heretofore known that high molecular weight substances containing a plurality of

—CO—NH—NH—CO— groups may be prepared by reacting dichlorocarbonic acid esters of polyhydroxyl compounds of molecular weights 500 to 5000 with hydrazine in the presence of acid-binding agents, or by reacting so-called prepolymers containing terminal NCO groups (and prepared from polyhydroxyl compounds and polyisocyanates) with hydrazine or hydrazides. The resulting high molecular weight substances are distinguished by highly elastic properties and may be processed to form films, threads, coatings and the like.

The necessity of using acid-binding agents in the reaction of hydrazine with high molecular weight dichlorocarbonic acid dichlorides is a disadvantage, because the separation of these acid binding agents and of the hydrochlorides from the polymeric reaction product always gives rise to difficulties.

The reaction of NCO-containing prepolymers with hydrazine or hydrazides frequently leads to the formation of unwanted side reactions which may cause the whole reaction mass to undergo swelling or cross-linking.

It has also been known to use so-called isocyanate splitting agents in the preparation of polyurethanes. These are compounds which react as isocyanates at elevated temperatures with active hydrogen atoms, splitting off hydrocyanic acid, phenol, acetylacetone, acetoacetic ester of malonic ester. By means of these splitting agents, it is possible to build up high molecular weight compounds with urethane groups or urea groups. The

—CO—NH—NH—CO— grouping cannot then be introduced into polymers except by the same mechanism as set forth above, i.e., the reaction of isocyanate groups with hydrazine or hydrazides.

It is therefore an object of this invention to provide an improved method of preparing polymers which overcomes the disadvantages of the prior art. It is another object of this invention to provide an improved method of preparing polymers containing the grouping

—CO—NH—NH—CO— in the molecule. It is another object of this invention to provide a method of preparing polymers containing the grouping —CO—NH—NH—CO— without the requirement that acid binding agents be present. It is a further object of this invention to provide a method of preparing polymers containing the grouping

—CO—NH—NH—CO— by a reaction that takes place at a moderate rate and without swelling of the polymer. It is still another object to provide new compositions of matter containing the grouping —CO—NH—NH—CO—.

The foregoing objects and others which will become apparent from the following description are accomplished in accordance with the invention generally speaking by providing high molecular weight polymers having the grouping —CO—NH—NH—CO— in the molecule by reacting an organic compound having a molecular weight of at least about 500 and containing active hydrogen atoms as determined by the Zerewitinoff test with a compound having the formula:

A—O—CO—NH—NH—(X—NH—NH)$_m$—CO—O—A wherein A is an aromatic radical; X is —CO—, —CO—CO—, —CO—R—CO— or

—CO—O—R—O—CO—

In the formula represented A may be any aromatic where R is a divalent organic radical and m is 0 or 1. radical such as, unsubstituted aromatic radicals including phenyl, naphthyl, diphenyl and the like; substituted aromatic radicals where the substituent can be alkyl, such as methyl, ethyl, propyl, butyl, amyl, hexyl, heptyl, isopropyl, isobutyl, tert. butyl, the various positional isomers of amyl, hexyl, heptyl and the like; alkoxy, such as methoxy, ethoxy, propoxy, butoxy and the like; nitro groups, halogen atoms such as chloro, fluoro, iodo, bromo and the like; where the substituent can be present on any position of the aromatic ring.

X can be any of the radicals set forth where R is a divalent organic radical such as alkylene including methylene, ethylene, propylene, butylene, pentylene, hexylene, the hydrocarbon of dimer acid, and the like; alkenylene such as, ethenylene, propenylene, butenylene and the like; arylene such as, phenylene, diphenylene, naphthalene and the like; aralkylene such as,

and the like. The organic radical represented by R may be interrupted by hetero atoms such as O, S or N such as, for example —CH$_2$—O—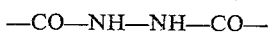—O—CH$_2$; —C$_3$H$_6$—O—C$_2$H$_4$—O—C$_3$H$_6$—

—C$_3$H$_6$—S—C$_3$H$_6$—; C$_3$H$_6$—O—C$_3$H$_6$; —C$_3$H$_6$—N(COOA)—C$_3$H$_6$— and the like.

The reactant represented by the formula can be prepared by reacting aromatic chloro-carbonic acid esters with hydrazine or dihydrazides such as those prepared by hydrazine or dihydrazides such as those prepared by reacting hydrazine with carbonic acid esters or acid chlorides or other dicarboxylic acids, anhydrides, esters or chlorides such as, malonic acid, oxalic acid, adipic acid, methyladipic acid, succinic acid, fumaric acid, itaconic acid, glutaric acid, phthalic acid, terephthalic acid, isophthalic acid, naphthalene dicarboxylic acid, biphenyldicarboxylic acid and the like, or the anhydrides, esters or acid chlorides thereof. The aromatic portion of the chlorocarbonic acid esters can be any of the radicals set forth above with regard to the definition of A.

The following compounds corresponding to the general formula represented are particularly suitable for the process according to the invention and are therefore preferred.

Hydrazo-dicarboxylic acid phenylester

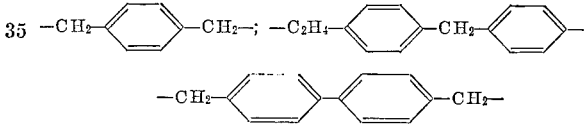

Carbonyl-di-(hydrazo-carboxylic acid phenylester)

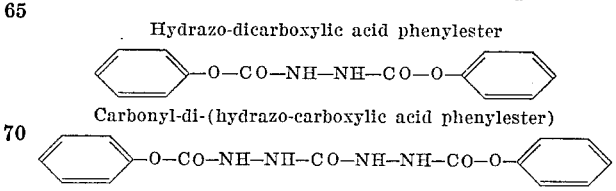

Succinyl-di-(hydrazo-carboxylic acid phenylester)

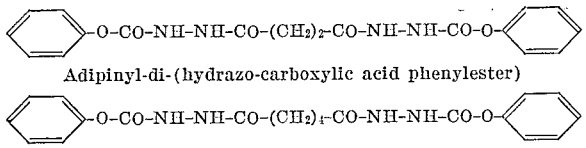

Adipinyl-di-(hydrazo-carboxylic acid phenylester)

The advantages of the process according to the invention compared with the known processes for the production of high molecular weight substances containing the —CO—NH—NH—CO— group several times consists in that no acid binding agents are required. In contrast to the reaction of NCO propolymers or polyisocyanates with hydrazine or hydrazides, which may easily lead to swelling, the reaction according to the invention takes place at a moderate rate and without swelling. Owing to the high reaction velocity and the great tendency for cross-linking reactions to occur, the reaction of NCO prepolymers or polyisocyanates with hydrazine or hydrazides can only be carried out in solution. The reactions in the process according to the invention may be carried out either in solution or with molten reaction components. A very particular advantage of the process according to the invention lies in the fact that the general grouping —CO—NH—NH—(X—NH—NH)$_m$—CO— may be introduced into substances such as polyethylene imine, polyvinyl-amine, or cellulose-2½ acetate.

The above mentioned compounds react as isocyanates at elevated temperatures with any organic compounds containing active hydrogen atoms such as, for example, polyhydroxyl ethers such as polyhydroxytetramethyleneoxide, by splitting off of phenols. The compound OCN-NCO ("diisocyanate") has hitherto been unknown and it appeared improbable that it could be produced. Hydrazo-dicarboxylic acid phenylester reacts like "diisocyanate." Carbonyl-di-(hydrazo-carboxylic acid phenylester) reacts like the diisocyanate

OCN—NH—CO—NH—NCO which is practically impossible to obtain in the free form.

Any suitable organic compound containing active hydrogen atoms as determined by the Zerewitinoff test and having a molecular weight greater than 500 may be used in accordance with this invention to react with compounds of the general formula represented such as, for example, polyamines and polyhydroxy compounds; any suitable polyamine may be used such as, polyethyleneimine, polyvinylamine or gelatine, polyamines which are obtained by the addition of acrylonitrile to high molecular weight polyhydroxyl compounds such as those mentioned below with subsequent hydrogenation of the nitrile groups. Also suitable are those that are obtained by addition of hydroxyazines to polyisocyanates followed by hydrolytic splitting off of the aldehyde, e.g., by reaction of a polytetramethylene oxide with toluylene diisocyanate and β-hydroxybenzazine and hydrolytic splitting off of the benzaldehyde with dilute acid.

Any suitable polyhydroxy compound may be used for the process according to the invention such as, for example, hydroxyl polyesters, polyhydric polyalkylene ethers, polyhydric polythioethers, polyacetals and the like.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyladipic acid, glutaric acid, pimelic acid, azelaic acid, phthalic acid, terephthalic acid, isophthalic acid, 1,2,4-benzene tricarboxylic acid, thiodipropionic acid, maleic acid, fumaric acid, citraconic acid, itaconic acid, and the like. Any suitable polyhydric alcohol may be used in the reaction with the polycarboxylic acid to form a polyester such as for example, ethylene glycol, propylene glycol, butylene glycol, amylene glycol, hexanediol, hexanetriol, glycerine, bis-(hydroxy-methyl-cyclohexane), trimethylol propane, pentaerythritol and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid, such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane, 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," vol. 7, pp. 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Also suitable as polyhydroxy compounds are cellulose acetate containing OH groups, starch, polyvinyl alcohol and partly saponified copolymers of ethylene and vinyl acetate, polyamides, polyureas and polyurethanes which contain OH groups or amine groups.

The compounds with active hydrogen atoms having a molecular weight greater than 500 may also contain a proportion of those with molecular weight less than 500, e.g., ethylene diamine, piperazine, γ,γ'-diamino-propylmethylamine, hexanediol, trimethylolpropane or pentaerythritol.

The reaction of compounds according to the general formula with high molecular weight compounds containing active hydrogen atoms is preferably carried out in the fused state at from about 100 to about 300° C., particularly about 120° C. to about 220° C., the split phenols being distilled off. It is advantageous to carry out the reaction to completion in vacuo. When compounds of the general formula are reacted with substances containing OH groups, it is found to be advantageous to use basic catalysts. Suitable catalysts are caustic alkalis, potassium carbonate, alcoholates, oxides and hydroxides of alkaline earth metals, zinc oxide, lead oxide and others. The reaction with compounds containing amino groups, either primary or secondary may advantageously be carried out in solvents or diluents. The reaction temperature should lie between 0 and 100° C., preferably between 20 and 50° C.

Any suitable solvent or diluent may be used such as, for example, dimethylformamide, dimethylacetamide, dimethylsulphoxide, chlorobenzene, methyl ethyl ketone, phenol and m-cresol and the like.

In the preparation of linear products, the proportions of reaction components are preferably so chosen that their reactive groups are present in equivalent quantities, whereas in the preparation of cross-linked products the proportions of the reaction components will be selected according to the desired degree of crosslinking.

The reaction products are important as synthetic materials, particularly for the manufacture of high quality elastomers for films and fibers, auxiliary agents for textiles, products used in photography and raw materials for lacquers and varnishes.

The invention is further illustrated but not limited by the following examples in which parts are by weight unless otherwise specified.

EXAMPLE 1

About 47.0 parts of a polytetramethylene oxide, OH number 44, are dried in vacuo at about 130° C. for about one hour. When the water has been removed, about 5.0 parts hydrazodicarboxylic acid phenylester (splitting agent) and about 0.050 part lead oxide are added to the fused polyhydroxy ether, and the reaction mixture is heated for about 4 hours at about 190 to about 200° C. in a nitrogen atmosphere. Most of the phenol that has been split off is thereby distilled off. To remove the remainder of the phenol, a vacuum of about 12 mm. Hg is applied for about 2 hours at about 190 to about 200° C.

The fused product solidifies to a tough, mechanically strong solid which begins to soften at about 100° C. K-value 71.2 (measured in m-cresol at 25° with 10 g./l.).

The hydrazodicarboxylic acid phenylester used in the reaction is prepared by treating about 100 parts of hydrazine hydrate dissolved in 1000 parts by volume of water with about 656 parts of phenyl chlorocarbonic acid ester and about 432 parts of sodium carbonate dissolved in 2000 parts by volume of water, at from about 0 to about 5° C. The crude dry ester is recrystallized from 5 parts by volume alcohol and 3 parts by volume water per part of crude dry ester. Yield: 76%, melting point 144 to 145° C. $C_{14}H_{12}N_2O_4$ (272.3).

Calculated: C, 61.75; H, 4.44; N, 10.29; O, 23.51. Found: C, 61.34; H, 4.64; N, 10.43; O, 23.56.

EXAMPLE 2

About 260 parts of a polytetramethylene glycol, OH number 43, are dried in vacuo at about 130° C. for about one hour and then heated with about 47.9 parts diphenylmethane-4,4′-diisocyanate for about 45 minutes at about 130° C. The fused mass is then cooled to about 100° C. and about 9.0 parts butane-1,4-diol are then added, and the viscous melt is then poured after about 5 minutes onto plates and the material is heated in a heating cupboard for about 3 hours at about 130° C. The polycondensate, which contains OH groups, is rolled at about 100° C. for 5 minutes on rubber rollers to form a pelt.

About 2.50 parts of a finely ground mixture of about 98 parts of hydrazodicarboxylic acid phenylester and about 2 parts of lead oxide are rolled into about 150 parts of the pelt. A foil 1 mm. thick is then produced in a press at about 160° C. for about 15 minutes at about 200 atmospheres.

The material treated with hydrazodicarboxylic acid phenylester has a relative viscosity of 3.7 whereas the film molded without the additive has a relative viscosity of only 3.0 (10 g./l. in m-cresol at 25° C.).

EXAMPLE 3

About 2.0 parts of hydrazodicarboxylic acid phenylester are added to a 10% solution of cellulose-2½ acetate in acetone. The substance is formed into a film by means of a wiper, and this film is heated for about 10 minutes at about 80° C. to evaporate the acetone and then for one hour at about 150° C. for crosslinking to occur. This film is completely insoluble in acetone and will not swell in it. Analogously, the cellulose-2½ acetate is crosslinked by means of the addition of about 2.0 parts hydrazodicarboxylic acid-guaiacolyl ester. If about 2.0 parts of carbonyl-di-(hydrazocarboxylic acid phenylester) or about 2.0 parts of succinyl-di-(hydrazocarboxylic acid phenylester) are added instead of 2.0 parts of hydrazodicarboxylic acid phenylester to the cellulose-2½ acetate solution in acetone, and a similar method is used, the films are insoluble in acetone but still liable to swell.

The hydrazodicarboxylic acid-guaiacolyl ester is prepared by the method described in Example 1 for the preparation of hydrazodicarboxylic acid phenylester. Melting point 199 to 200° C. $C_{16}H_{16}N_2O_6$ (332.2).

Calculated: C, 57.83; H, 4.85; N, 8.43; O, 28.89. Found: C, 57.85; H, 4.88; N, 8.50; O, 28.88.

Carbonyl-di-(hydrazocarboxylic acid phenylester) is prepared by dissolving about 18.0 parts of carbodihydrazide in about 200 parts by volume of water and adding to this solution about 66.0 parts of phenyl chlorocarbonic acid ester and about 43.2 parts of sodium carbonate in about 200 parts by volume of water drop by drop at from about 0 to about 5° C. The dry crude product is recrystallized from about 8 parts by volume alcohol and 2 parts by volume water per parts of product.

Yield: 72%, melting point 179–180° C.

$$C_{15}H_{14}N_4O_5.2H_2O$$
(366.35).

Calculated: C, 49.18; H, 4.95; N, 15.30; O, 30.57. Found: C, 49.46; H, 4.96; N, 15.45; O, 30.21.

Succinyl-di-(hydrazocarboxylic acid phenylester) is prepared by dissolving about 43.8 parts succinic acid dihydrazide in 300 parts by volume of water and adding to this solution dropwise about 99.0 parts of phenylchlorocarbonic acid ester and about 64.8 parts of sodium carbonate in 300 parts by volume of water at from about 0 to about 5° C. All the liquid is thoroughly removed by suction, and the moist crude product is recrystallized from about 12 parts by volume of alcohol per parts of product. The melting points is 180° C. $C_{18}H_{18}N_4O_6$ (386.4).

Calculated: C, 55.95; H, 4.70; N, 14.50; O, 24.85. Found: C, 55.36; H, 4.99; N, 14.20; O, 24.40.

EXAMPLE 4

About 2.9 parts of hydrazodicarboxylic acid phenylester dissolved in about 20 parts dimethylformamide are added to about 100 parts of a 15% solution of polyvinyl alcohol in dimethylformamide heated to about 50° C., and the hot solution is poured onto a glass base and spread into films by means of a wiper. When heated for about one hour at from about 130 to about 135° C., the film becomes insoluble in dimethylformamide whereas another film prepared for comparison without the hydrazodicarboxylic acid phenylester remains soluble and shows a marked brown discoloration.

EXAMPLE 5

About 50 parts of a 50% aqueous solution of polyethyleneimine are diluted with about 50 parts dimethylformamide and treated with about 1.6 parts hydrazodicarboxylic acid phenylester dissolved in about 5 parts dimethylformamide. When the cross-linking agent is stirred in, the solution solidifies at about 20° C. to a gel.

It is to be understood that the invention is not limited by the examples which are for the purpose of illustration but that any of the compounds within the formula represented can be used throughout the examples in place of the specific compounds used. Also, any compound containing active hydrogen groups within the aforegoing description can be used in place of the specific compounds of the examples.

Although the invention has been described in considerable detail for the purpose of illustration, it is to be understood that variations can be made by those skilled in the art without departing from the spirit of the invention and scope of the claims.

What is claimed is:

1. A process for the production of high molecular weight polymers having the grouping

—CO—NH—NH—CO— which comprises reacting an organic compound having a molecular weight of at least about 500 and containing active hydrogen atoms which are determined by the Zerewitinoff test with a compound having the formula:

A—O—CO—NH—NH
—(X—NH—NH)$_m$—CO—O—A wherein A is an aromatic radical, X is selected from the group consisting of —CO—, —CO—CO— and

—CO—R—CO— where R is an organic radical or an oxygen, sulfur or nitrogen interrupted organic radical selected from the group consisting of alkylene, alkenylene, arylene and aralkylene and $m$ is an integer of 0 or 1.

2. A process for the production of high molecular weight polymers having the grouping

—CO—NH—NH—CO— which comprises reacting an organic compound having a molecular weight of at least about 500 and selected from the group consisting of organo polyhydroxy compounds and organo polyamines with a compound having the formula:

A—O—CO—NH—NH
—(X—NH—NH)$_m$—CO—O—A wherein A is an aromatic radical, X is selected from the group consisting of —CO— and —CO—CO—,

—CO—R—CO— where R is an organic radical or an oxygen, sulfur or nitrogen interrupted organic radical selected from the group consisting of alkylene, alkenylene, arylene and aralkylene and $m$ is an integer of 0 or 1.

3. The process of claim 1 wherein the compound represented by the formula is hydrazo-dicarboxylic acid phenylester.

4. The process of claim 1 wherein the compound represented by the formula is carbonyl-di-(hydrazo-carboxylic acid phenylester).

5. The process of claim 1 wherein the compound represented by the formula is succinyl-di-(hydrazo-carboxylic acid phenylester).

References Cited

UNITED STATES PATENTS

| | | | |
|---|---|---|---|
| 2,281,576 | 5/1942 | Hanford | 260—78 |
| 2,512,631 | 6/1950 | Fisher et al. | 260—78 |
| 2,615,862 | 10/1952 | McFarlane et al. | 260—78 |
| 3,130,182 | 4/1964 | Frazer | 260—78 |
| 3,130,183 | 4/1964 | Frazer | 260—78 |
| 2,356,702 | 8/1944 | Schlack | 260—77.5 |
| 2,378,571 | 6/1945 | Moldenhauer et al. | 260—77.5 |
| 2,533,189 | 12/1950 | Flory et al. | 260—47.9 |
| 2,703,810 | 3/1955 | Viard | 260—77.5 |
| 2,957,852 | 10/1960 | Frankenburg et al. | 260—77.5 |

FOREIGN PATENTS 745,473   3/1944   Germany.

WILLIAM H. SHORT, *Primary Examiner.*

S. H. BLECH, *Examiner.*

H. D. ANDERSON, C. A. WENDEL,
*Assistant Examiners.*